(12) United States Patent
Chou et al.

(10) Patent No.: US 7,397,096 B2
(45) Date of Patent: Jul. 8, 2008

(54) STRUCTURE OF SWEEP-TYPE FINGERPRINT SENSING CHIP CAPABLE OF RESISTING ELECTROSTATIC DISCHARGE (ESD) AND METHOD OF FABRICATING THE SAME

(75) Inventors: Bruce C. S. Chou, Hsin Chu (TW); Chen-Chih Fan, Chu Pei (TW)

(73) Assignee: LighTuning Tech. Inc., Hsinchu (TW)

( * ) Notice: Subject to any disclaimer, the term of this patent is extended or adjusted under 35 U.S.C. 154(b) by 129 days.

(21) Appl. No.: 11/476,027

(22) Filed: Jun. 28, 2006

(65) Prior Publication Data

US 2007/0001249 A1   Jan. 4, 2007

(30) Foreign Application Priority Data

Jun. 29, 2005   (TW)   ............................... 94121761 A (51) Int. Cl.
 *H01L 27/14* (2006.01)
(52) U.S. Cl. ........................... 257/414; 438/48; 382/124
(58) Field of Classification Search ................. 257/414, 257/642, 643, 741; 438/48, 780; 382/124
See application file for complete search history.

(56) References Cited

U.S. PATENT DOCUMENTS

| | | | |
|---|---|---|---|
| 6,091,082 A | 7/2000 | Thomas et al. | |
| 6,114,862 A | 9/2000 | Tartagni et al. | |
| 6,515,488 B1 | 2/2003 | Thomas | |
| 6,762,470 B2 * | 7/2004 | Siegel et al. | ................. 257/414 |
| 7,076,089 B2 * | 7/2006 | Brandt et al. | ................. 382/124 |
| 2003/0190061 A1 | 10/2003 | Chou et al. | |
| 2003/0215976 A1 | 11/2003 | Chou et al. | |
| 2004/0046574 A1 | 3/2004 | Chou | |
| 2004/0208345 A1 | 10/2004 | Chou et al. | |
| 2005/0231213 A1 | 10/2005 | Chou et al. | |

FOREIGN PATENT DOCUMENTS

| | | |
|---|---|---|
| EP | 1 256 899 A1 | 11/2002 |
| WO | WO-01/06448 A1 | 1/2001 |
| WO | WO-03/098541 A1 | 11/2003 |

* cited by examiner

*Primary Examiner*—Mark Prenty
(74) *Attorney, Agent, or Firm*—Muncy, Geissler, Olds & Lowe, PLLC

(57) ABSTRACT

A structure of sweep-type fingerprint sensing chip capable of resisting electrostatic discharge (ESD) includes a semiconductor substrate, and a sweep-type fingerprint sensing chip formed on the semiconductor substrate, a polymer layer and a conducting metal layer. The sweep-type fingerprint sensing chip includes a sensing array region and a peripheral circuit region. The sensing array region has an exposed area for sensing a plurality of fingerprint fragment images as a finger sweeps thereacross. The peripheral circuit region, which is formed on the substrate and located around the sensing array region, controls an operation of the sensing array region. The polymer layer is disposed on the peripheral circuit region and has a flat and smooth outer surface. The conducting metal layer is disposed on the flat and smooth outer surface of the polymer layer. The conducting metal layer discharges the approaching electrostatic charges to the ground to avoid damaging of the sensing chip.

12 Claims, 7 Drawing Sheets

STRUCTURE OF SWEEP-TYPE FINGERPRINT SENSING CHIP CAPABLE OF RESISTING ELECTROSTATIC DISCHARGE (ESD) AND METHOD OF FABRICATING THE SAME

BACKGROUND OF THE INVENTION

1. Field of the Invention

The invention relates to a structure of a sweep-type fingerprint sensing chip capable of resisting electrostatic discharge, and a method of fabricating the same. The invention correlates to the commonly assigned patents of: (a). U.S. patent application Ser. No. 10/403,052 (US20030190061A1), filed on Apr. 1, 2003, entitled "CAPACITIVE FINGERPRINT SENSOR," and published on Oct. 9, 2003 as US20030190061A1; (b). U.S. patent application Ser. No. 10/434,833 (US20030215976A1), filed on May 13, 2003, entitled "PRESSURE TYPE FINGERPRINT SENSOR FABRICATION METHOD"; (c). U.S. patent application Ser. No. 10/414,214 (US20040208345A1), filed on Apr. 16, 2003, and entitled "THERMOELECTRIC SENSOR FOR FINGERPRINT THERMAL IMAGING"; (d). U.S. patent application Ser. No. 10/638,371 (US20040046574A1), filed on Aug. 12, 2003, and entitled "CAPACITIVE MICRO PRESSURE SENSING MEMBER AND FINGERPRINT SENSOR USING THE SAME"; (e). U.S. patent application Ser. No. 10/429,733, filed on May 6, 2003, and entitled "CAPACITIVE FINGERPRINT SENSOR AGAINST ESD DAMAGE AND CONTAMINATION INTERFERENCE AND A METHOD FOR MANUFACTURING THE SAME"; (f). U.S. patent application Ser. No. 10/825,313 (US20050231213A1), filed on Apr. 16, 2004 and entitled "CHIP-TYPE SENSOR AGAINST ESD AND STRESS DAMAGES AND CONTAMINATION INTERFERENCE"; and (g) U.S. patent application Ser. No. 11/376,179 filed on Mar. 16, 2006, and entitled "LINEAR IMAGE SENSING DEVICE WITH IMAGE MATCHING FUNCTION AND PROCESSING METHOD THEREFOR".

2. Description of the Related Art

Traditionally, IC design focuses on the electrical characteristics of the IC chip and the chip is packaged inside a protection body to prevent it from damaging by the external force or ESD (Electrostatic Discharge).

Nevertheless, some new applications need the chip surface to be partially exposed to the environment, for example, a chip-type fingerprint sensor, as disclosed in the above-mentioned application entitled "CAPACITIVE FINGERPRINT SENSOR", needs to provide a chip surface to be in contact with the finger, so that the ridges of the finger may be read for identification or verification.

Consequently, the mechanical property of the chip surface has to be well considered so that the protection structure of the chip can withstand the finger's vertical force and the ESD damage from the finger or other approaching objects.

In the basic structure of the conventional capacitive fingerprint sensor chip, associated sense and control/processing circuits are formed in a silicon substrate, a plurality of metal plates arranged in an array is disposed on the chip and serves as the sense electrodes (the portion below the sense electrodes and including the sense and control/processing circuits and the silicon substrate is referred to as a substrate structure), and a dielectric layer is formed on an external surface of the chip to serve as the dielectric medium of the sense capacitor between the finger and each sense electrode as well as the passivation layer for the exposed chip surface. In order to achieve the force-withstanding and wear-resistant properties of the chip surface, the prior art utilizes a hard coating material to form the passivation layer on the external surface. For example, all of the WO 01/06448A1, WO 03/098541A1, U.S. Pat. No. 6,091,082, EP1256899, U.S. Pat. Nos. 6,114,862, and 6,515,488 patents disclose this architecture. In brief, the prior art patents include a hard layer, such as the silicon nitride, silicon carbide, aluminum oxide or diamond, formed above the substrate structure, or include a soft dielectric material, such as the silicon dioxide, formed between the hard layer and the substrate structure.

The hard layer, such as the silicon nitride, silicon carbide, aluminum oxide or diamond, has the good mechanical strength. However, when the hard layer is formed on the substrate structure using the semiconductor processing method, the thickness limitation thereof will be encountered because of the residual thermal stress between the hard layer and the substrate structure. In general, the silicon nitride, silicon carbide, aluminum oxide or diamond exhibits the tensile stress against the substrate structure mainly including the silicon substrate. If the hard layer is thick, it tends to crack owing to the stress. Consequently, the chip tends to crack and cannot withstand the ESD damage or force impingement. Typically, a single hard layer or a bimorph layer around 2 microns or less is formed on the sensor surface to overcome the above-mentioned problems due to the process limitation available in semiconductor factory. Nevertheless, a relatively large residual thermal stress still exists therein, which will induce material defects therein and form stress concentration points around those defects, and may easily be broken by external force or ESD. Hence, it is an important subject to reduce the residual thermal stress and thus increase the thickness of the protection structure because the mechanical strength is directly proportional to the third power of the thickness.

In addition to the above-mentioned mechanical property such as the force-withstanding property of the chip surface, the ESD damage is another important subject. There are two ways for solving the ESD damage. One way is to increase the thickness of the passivation layer because the electrostatic field intensity that may be withstood is directly proportional to the square of the thickness.

In the typical commercial IC (integrated circuit) process, for example, the thickness of the passivation layer (usually including a bimorph structure composed of the silicon dioxide and the silicon nitride) is about 1 micron, and the ESD damage voltage (air mode) that may be withstood is about 1 KV. Also, because the structure of the passivation layer of the above-mentioned patents cannot be effectively increased in thickness, the protection against the ESD damage cannot be achieved only depending on the material property of the passivation layer.

Hence, the other way is to utilize the exposed metal mesh structure to conduct the electrostatic charges to the ground, as mentioned in the above-mentioned patents WO 01/06448A1, WO 03/098541A1 and EP1256899. The concept of using the conductor to conduct the electrostatic charges has been adopted in many electronics products. However, the key issues having to be considered is the process and material compatibility when implementing the exposed metal mesh on the fingerprint sensor chip to solve the ESD problem.

For example, WO 01/06448A1 patent discloses this idea of an exposed metal mesh structure serving as the conducting structure for the electrostatic charges. However, the used manufacturing processes, the single layer TiN serving as the metal sense electrode material, and the exposed metal mesh material is not a standard processing step in commercial IC foundry. In addition, the thin TiN film may have the step coverage problem when it is formed on the rugged chip surface. Furthermore, because of the high resistivity of the TiN film, an arbitrarily large current caused by the electrostatic charges flowing therethrough may burn it out due to the joule heating effect. In addition, WO 03/098541A1 patent also discloses an exposed metal mesh structure, which is substantially the same as that of the WO 01/06448A1 patent, as the conducting structure for the electrostatic charges. The main difference therebetween is that the external surface of the exposed metal includes the gold material, which may solve the erosion problem of the metal. However, the manufacturing processes cannot be compatible with the silicon IC manufacturing processes because the gold material may cause contamination.

EP1256899 patent discloses a tungsten metal mesh design. However, in the step of depositing the tungsten metal and the subsequent etching back step, small cavities, which are regarded as defects and cause the problems such as stress concentration points around those defects, are formed on the sensor surface of the passivation layer of silicon carbide. When the fingernail unintentionally hits the external surface of the sensor, the sensor may be damaged. Furthermore, the small cavities make the surface of the passivation layer hydrophilic. Thus, the moisture of the finger tends to diffuse after the finger contacts the external surface, and the image quality is deteriorated accordingly. Consequently, a method is needed for refilling the small cavities with the silicon dioxide so as to make the external surface smooth by depositing the silicon dioxide followed by the CMP process. However, this way makes the manufacturing processes too complicated and is not suitable for the general manufacturing procedures of the commercial IC foundry.

To solve the above-mentioned problems, the above-mentioned (e) patent has disclosed a capacitive fingerprint sensor against ESD damage and contamination interference, wherein the sensor includes a silicon substrate formed with integrated circuits, a plurality of plate electrodes, a metal mesh, a plurality of ESD units, a plurality of bonding pads and a passivation layer. The metal mesh crisscrosses between the plate electrodes, is flush with the plate electrodes, and encloses each of the plate electrodes. The metal mesh is grounded. The ESD units are connected to the metal mesh and are formed between a predetermined number of adjacent plate electrodes among the plate electrodes, wherein the number of ESD units is smaller than the number of plate electrodes.

Figure 1:
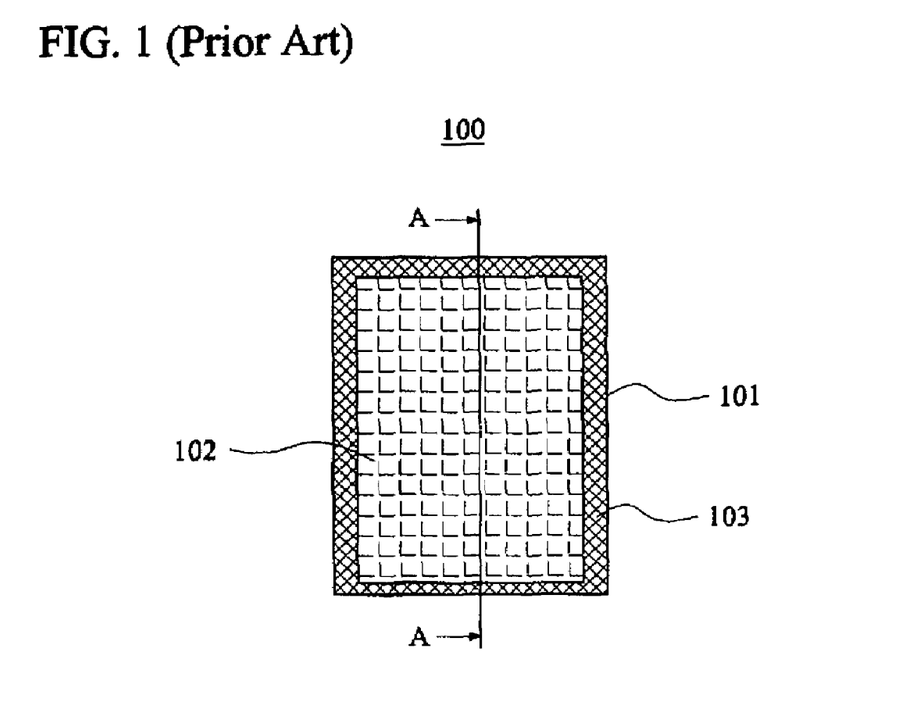
FIG. 1 is a schematic illustration showing the exterior of an area-type fingerprint sensing chip.

Heretofore, the above-mentioned prior arts consider the effect against the ESD damage in the area-type fingerprint sensing chip. Taking the product LTT-C500 manufactured by LIGHTUNING TECH. INC., the sensing area of the product is equal to 192 pixels×236 pixels (9.6 mm×11.8 mm), and the chip size is about 10 mm×12 mm. It is clear that the main chip area is formed with the two-dimensional sensing member array, so the design against the ESD damage is made according to the consideration of the sensing area. FIG. 1 is a schematic illustration showing the exterior of an area-type fingerprint sensing chip. Referring to FIG. 1, the area-type fingerprint sensing chip 100 includes a two-dimensional sensing member array 102 formed on a semiconductor substrate 101 and an associated read and control circuit 103, such as a gain adjustable amplifier, an analog-to-digital converter and a control logic, located around the two-dimensional sensing member array 102.

Figure 2:
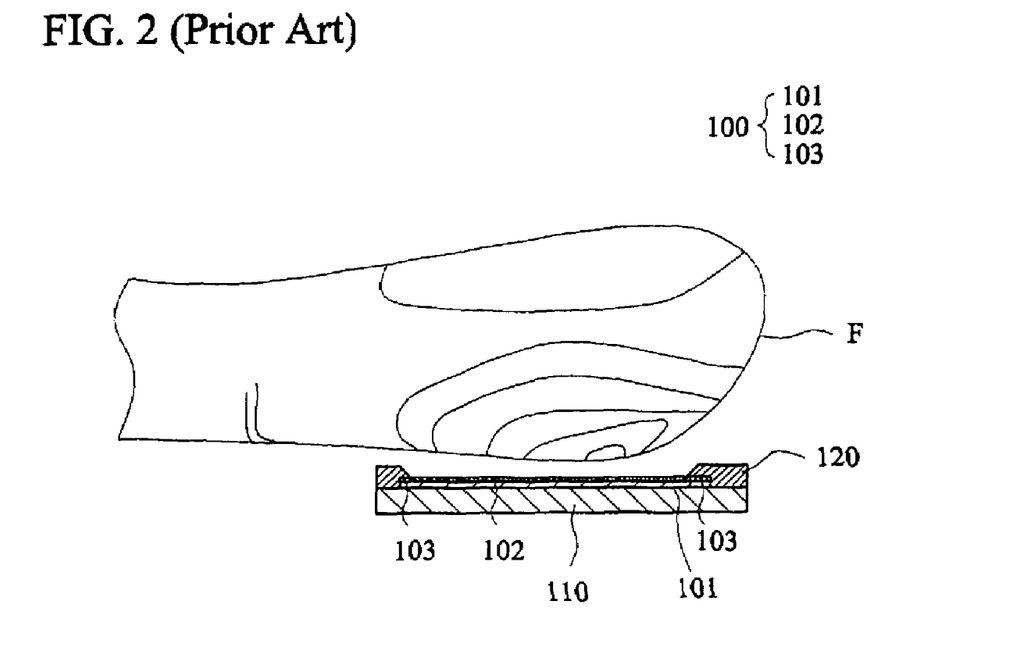
FIG. 2 is a schematically cross-sectional view taken along the line A-A of FIG. 1 after the fingerprint sensing chip of FIG. 1 is packaged.

FIG. 2 is a schematically cross-sectional view taken along the line A-A of FIG. 1 after the fingerprint sensing chip of FIG. 1 is packaged. As shown in FIG. 2, the area-type fingerprint sensing chip 100 is placed on a package substrate 110 and wired and encapsulated. An encapsulant 120 seals the read and control circuit 103 to protect the circuit 103 from being damaged by a finger F or an external force. As shown in FIG. 2, this area-type fingerprint sensing chip protects its associated circuit, by way of package including encapsulation and transfer molding, from the external environment interference and the ESD damage. Consequently, the considerations of the main environment interference and the ESD damage focus on the two-dimensional sensing member array 102, which is the key point of the above-mentioned prior art.

However, the sensing area of the conventional chip-type fingerprint sensor is larger than 9 mm×9 mm due to the limitation of the dimension of the finger. Furthermore, only 50 to 70 effective chips can be formed on a 6" wafer due to the limitation of manufacturing the silicon integrated circuit. So, the cost of the fingerprint sensor is very high, which restricts its applications to various consumer electronic products, such as a notebook computer, a mobile phone, a personal digital assistant, a computer peripheral product, and even a personal ID card combined with the fingerprint sensor.

Figure 3:
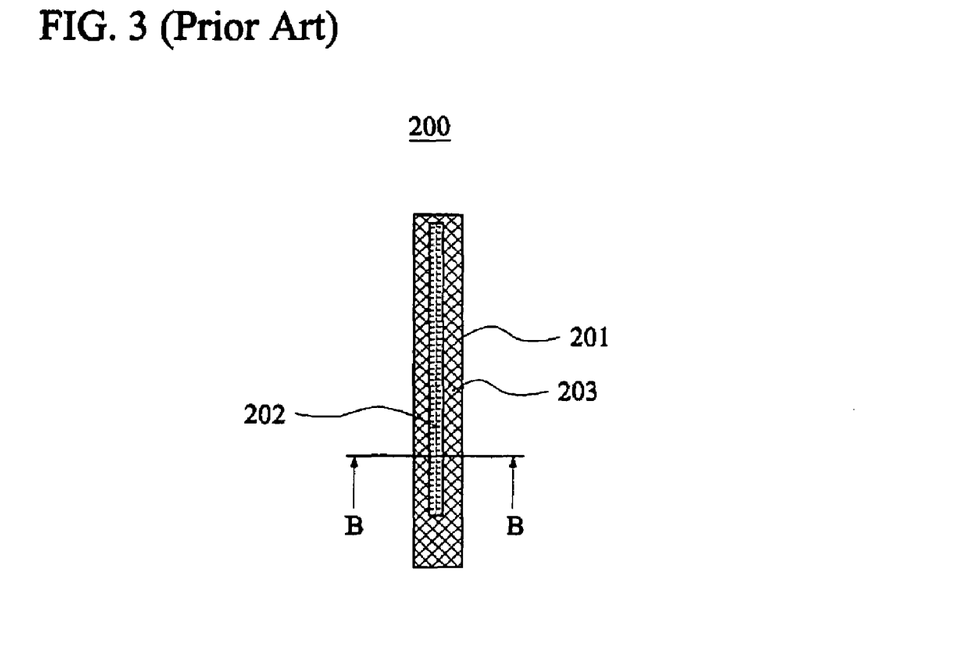
FIG. 3 is a schematic illustration showing the exterior of a sweep-type fingerprint sensing chip.
Figure 4:
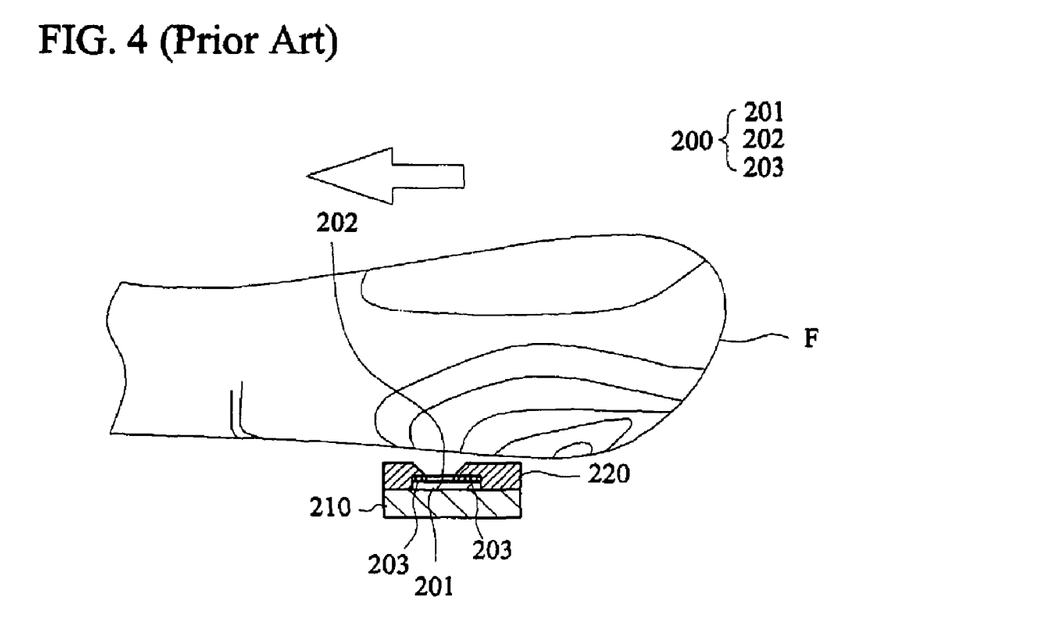
FIG. 4 is a schematically cross-sectional view taken along the line B-B of FIG. 3 after the fingerprint sensing chip of FIG. 3 is packaged.

In order to overcome the above-mentioned problem in cost, the length of the conventional two-dimensional chip-type fingerprint sensor may be shortened. In this case, the finger sweeps across the surface of the chip such that multiple fingerprint fragment images are obtained and then reconstructed into a complete image. Thereafter, the finger may sweep across the surface of the chip so that a fingerprint template is obtained. Thus, the user can be identified by comparing the fingerprint template with the reference template. For example, the chip size of the above-mentioned (g) patent is smaller than 1.5 mm in the sliding direction of the finger, and the length of the sensing member is 0.4 mm (8 pixels). The schematic illustration is shown in FIG. 3. FIG. 3 is a schematic illustration showing the exterior of a sweep-type fingerprint sensing chip. FIG. 4 is a schematically cross-sectional view taken along the line B-B of FIG. 3 after the fingerprint sensing chip of FIG. 3 is packaged. As shown in FIGS. 3 and 4, the sweep-type fingerprint sensing chip 200 includes a sensing member array 202 formed on a semiconductor substrate 201 and a read and control circuit 203, including a gain adjustable amplifier, an analog-to-digital converter and a control logic, disposed around the sensing member array 202. If the sweep-type fingerprint sensing chip 200 is placed on a package substrate 210 for package including wiring and encapsulating processes in a manner similar to the conventional area-type fingerprint sensing chip 100, the encapsulant 220 encapsulates the read and control circuit 203 to protect it. As shown in FIGS. 3 and 4, when the finger F sweeps across the surface of the packaged chip, the finger cannot easily touch the sensing area of the chip because the peripheral encapsulating height is too high (usually higher than several hundreds of microns). This is because the protection encapsulants at two sides are too high such that the finger F cannot easily touch the chip surface. Thus, the package thereof has to expose the read and control circuit 203, as shown in FIG. 5, and the chip surface has to be flat such that the finger can contact the chip surface effectively.

Figure 5:
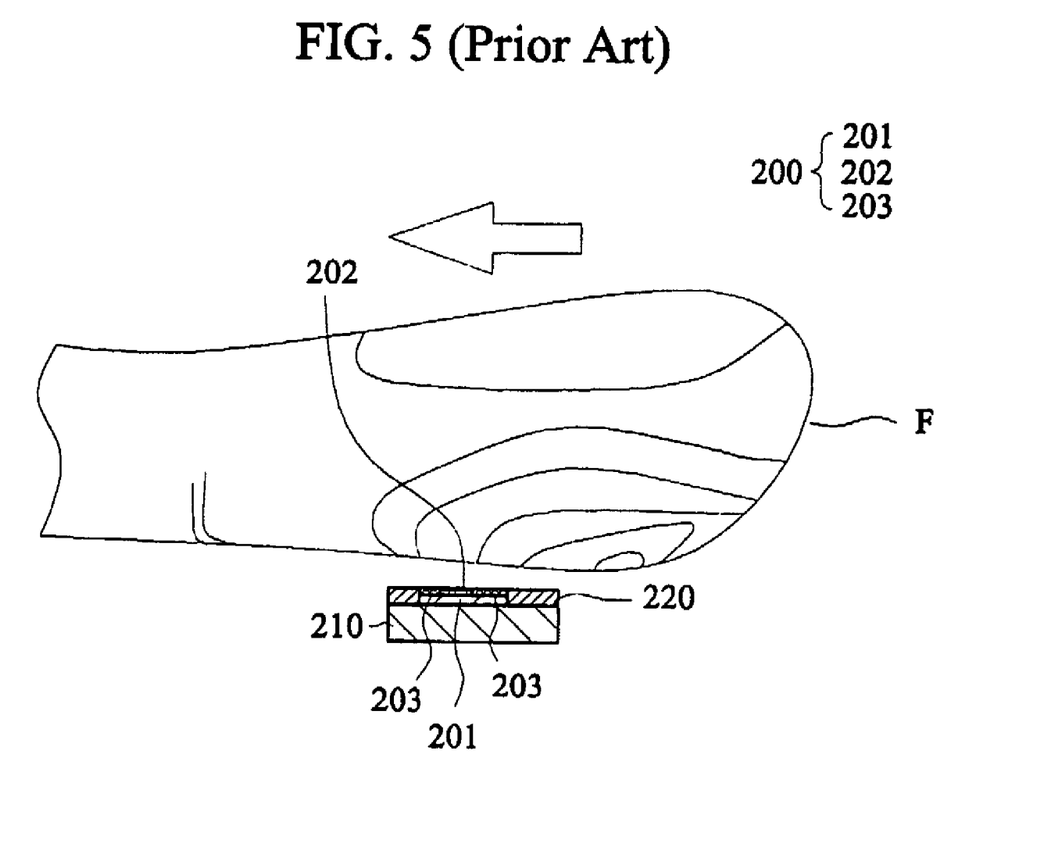
FIG. 5 is a schematic illustration showing a package structure of a conventional sweep-type fingerprint sensing chip.

FIG. 5 is a schematic illustration showing a package structure of a conventional sweep-type fingerprint sensing chip. As shown in FIG. 5, in order to make the sweeping finger F touch the sensing member array 202 easily, the package has to be made to have the flat plane, or only a small height difference, such as several microns, is allowed. The area occupied by the read and control circuit 203 around the sensing member array 202 is almost one half of the overall sweep-type fingerprint sensing chip 200. Consequently, if the requirement of the flat surface on which the finger sweeps has to be met, the key point of the ESD protection aims at the peripheral circuit, which is different from the area-type sensor with the key protection point on the two-dimensional sensing member array, as mentioned hereinabove.

Figure 6A:
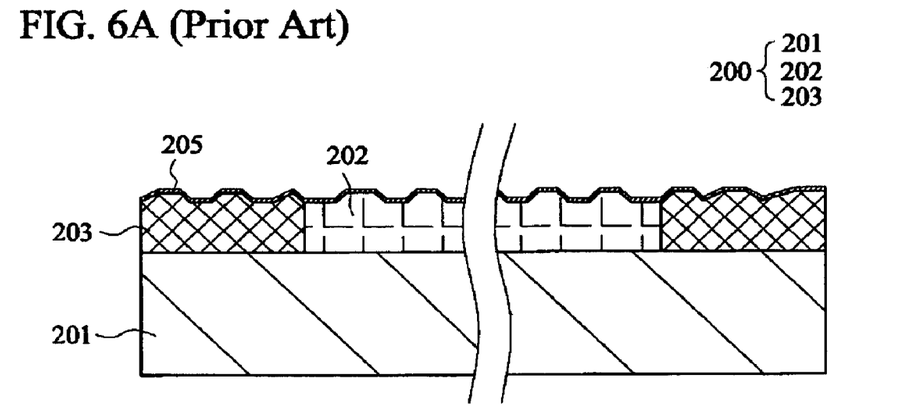
FIGS. 6A to 6C are schematic illustrations showing conventional structures of the sweep-type fingerprint sensing chip.
Figure 6B:
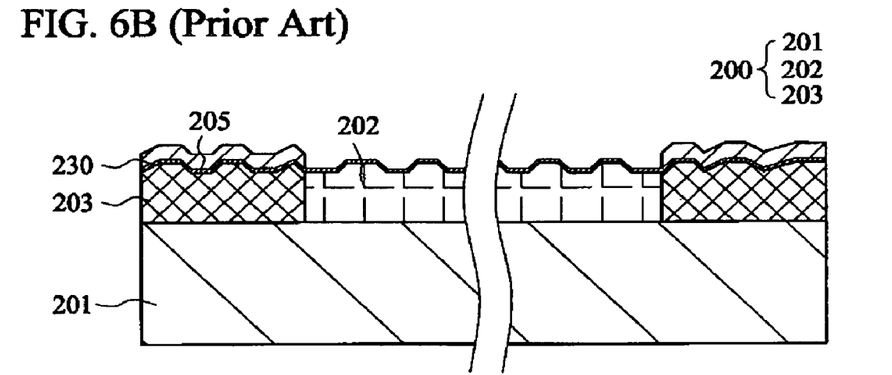
Figure 6C:
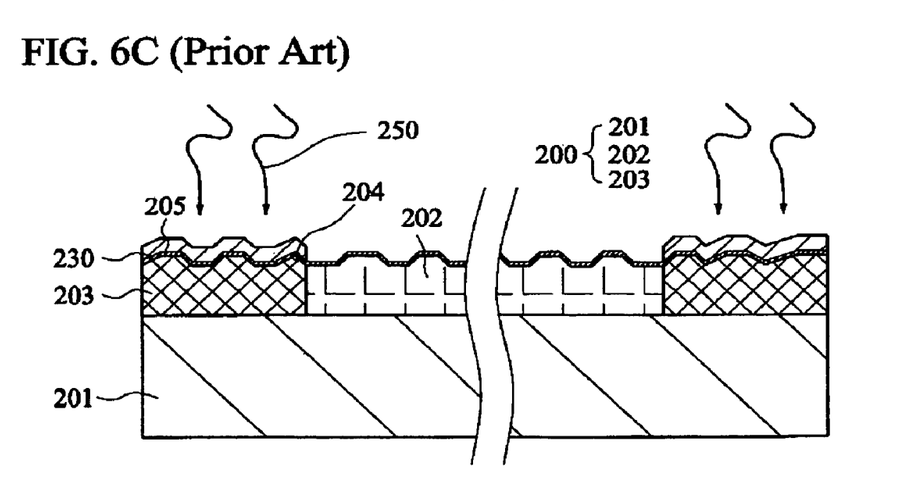

When the chip encounters the ESD interference, the exposed read and control circuit 203 in FIG. 5 tends to be damaged. In one case, the latch-up effect tends to occur and the chip cannot be used until it is reset. In another case, the chip is totally damaged by the electrostatic charges. FIGS. 6A to 6C are schematic illustrations showing conventional structures of the sweep-type fingerprint sensing chip. As shown in FIGS. 6A to 6C, the conventional solution is to dispose a metal layer 230, which is to be grounded, on the sweep-type fingerprint sensing chip 200 by way of coating or plating. However, this solution tends to cause the tip discharge under the ESD interference due to the uneven chip surface, and the read and control circuit 203 is thus damaged. For example, when the electrostatic charge 250 hits the chip, the tip 204 causes the tip discharge to damage the read and control circuit 203. In addition, a serious parasitic capacitor between the grounded metal layer 230 and the read and control circuit 203 tends to occur because the passivation layer 205 made of, for example, silicon dioxide and silicon nitride covering the external surface of the sweep-type fingerprint sensing chip 200 in the semiconductor foundry does not have a very small dielectric constant and the thickness thereof is only about 1 micron. In addition, the grounding condition of the metal layer 230 tends to interfere with the operation of the read and control circuit 203 due to the floating grounding voltage. Thus, it is problematic to dispose a metal film on the passivation layer of the read and control circuit 203 directly.

SUMMARY OF THE INVENTION

It is therefore an object of the invention to provide a structure of a sweep-type fingerprint sensing chip capable of resisting electrostatic discharge and a method of fabricating the same so as to solve the problem caused by the tip discharge.

To achieve the above-mentioned object, the invention provides a fingerprint chip structure including a semiconductor substrate, a fingerprint sensing chip, a polymer layer and a conducting metal layer. The fingerprint sensing chip is formed on the semiconductor substrate and includes a sensing array region and a peripheral circuit region. The sensing array region has an exposed fingerprint sensing area for sensing a plurality of fingerprint fragment images of a finger as the finger sweeps across the sensing array region. Two adjacent ones of the plurality of fingerprint fragment images partially overlap with each other. The peripheral circuit region, which is formed on the semiconductor substrate and located aside the sensing array region, controls an operation of the sensing array region. The polymer layer is disposed on the peripheral circuit region and has a flat and smooth outer surface. The conducting metal layer, which is disposed on the flat and smooth outer surface of the polymer layer, discharges electrostatic charges.

The invention also provides a method of manufacturing a fingerprint chip structure. The method includes the steps of: (a) forming a fingerprint sensing chip on a semiconductor substrate, wherein the fingerprint sensing chip comprises: a sensing array region having an exposed fingerprint sensing area for sensing a plurality of fingerprint fragment images of a finger as the finger sweeps across the sensing array region, wherein two adjacent ones of the plurality of fingerprint fragment images partially overlap with each other; and a peripheral circuit region, which is formed on the semiconductor substrate and located aside the sensing array region, for controlling an operation of the sensing array region; (b) forming a polymer layer on the peripheral circuit region, the polymer layer having a flat and smooth outer surface; and (c) forming a conducting metal layer for discharging electrostatic charges on the flat and smooth outer surface of the polymer layer.

The step (b) basically includes the sub-steps of: (b1) spin coating a polymeric material on the fingerprint sensing chip; (b2) curing the polymeric material to form the polymer layer having the flat and smooth outer surface; and (b3) partially removing the polymer layer to expose the fingerprint sensing area.

Thus, the ESD protection can be effectively achieved.

DETAILED DESCRIPTION OF THE INVENTION

Figure 7:
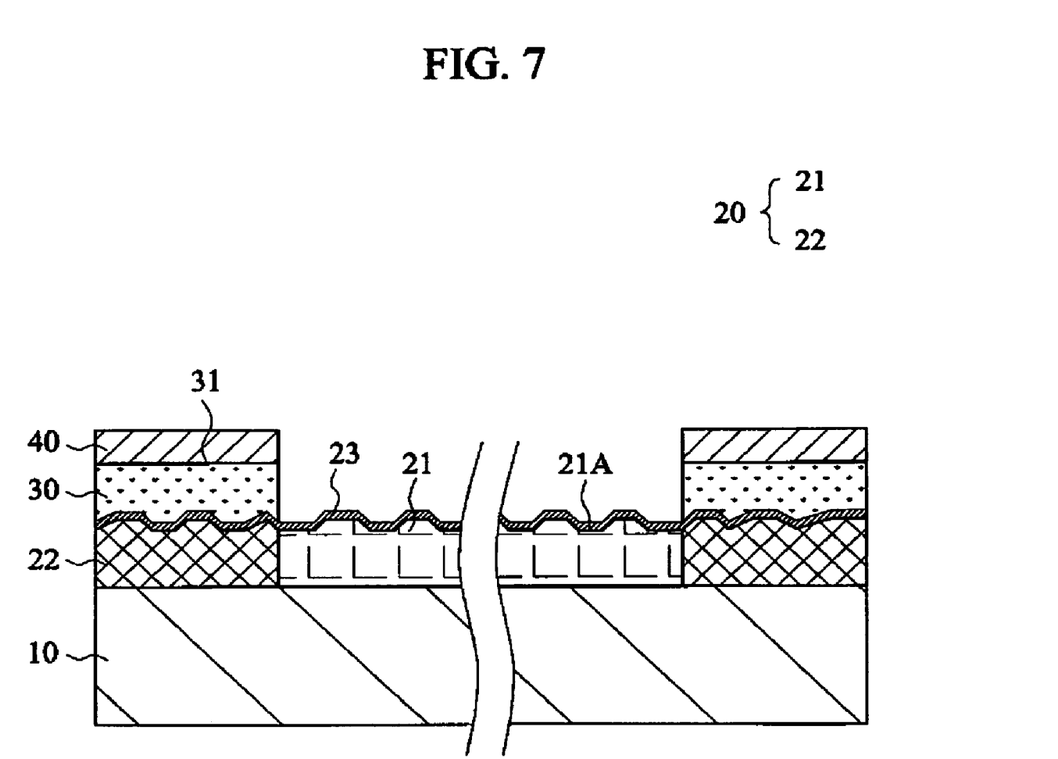
FIG. 7 is a schematic illustration showing the structure of a sweep-type fingerprint sensing chip according to a preferred embodiment of the invention.

FIG. 7 is a schematic illustration showing the structure of a sweep-type fingerprint sensing chip according to a preferred embodiment of the invention. It is to be noted that the sweep-type fingerprint sensor acquires a plurality of fingerprint fragment images of a finger as the finger sweeps across the fingerprint sensor, and two adjacent ones of the plurality of fingerprint fragment images partially overlap with each other. Referring to FIG. 7, the structure of the sweep-type fingerprint sensing chip (also referred to as fingerprint chip structure) includes a semiconductor substrate 10, a sweep-type fingerprint sensing chip 20, a polymer layer 30 and a conducting metal layer 40. The sweep-type fingerprint sensing chip 20 is formed on the semiconductor substrate 10 and includes a sensing array region 21 and a peripheral circuit region 22. The sensing array region 21 has an exposed fingerprint sensing area 21A for sensing a plurality of fingerprint fragment images of a finger as the finger sweeps across the sensing array region 21. Two adjacent ones of the plurality of fingerprint fragment images partially overlap with each other. The fingerprint sensing area 21A is usually protected by a dielectric layer 23, which may be a hard layer made of, for example, silicon nitride, silicon carbide, aluminum oxide or diamond. The peripheral circuit region 22 includes a read and control circuit including, for example, a gain adjustable amplifier, an analog-to-digital converter and a control logic. The peripheral circuit region 22, which is formed on the semiconductor substrate 10 and located aside the sensing array region 21, controls the operation of the sensing array region 21, and further processes the fingerprint fragment images. The peripheral circuit region 22 has an exposed wire bonding area (not shown) for input/output.

The polymer layer 30 is disposed on the peripheral circuit region 22 and has a flat and smooth outer surface 31. The polymer layer is made of polyimide, benzocyclobutene (BCB), SU-8 or any other suitable material. In this embodiment, the thickness of the polymer layer is greater than 2 microns, and preferably ranges from 2 microns to 5 microns. In this embodiment, the number of pixels in the sweeping direction of the finger is smaller than 32. The conducting metal layer 40 is disposed on the flat and smooth outer surface 31 of the polymer layer to discharge electrostatic charges. The conducting metal layer may be made of aluminum, gold or any other suitable material, and the thickness thereof is greater than 1 micron. The conducting metal layer may be grounded to discharge the electrostatic charges.

Figure 8A:
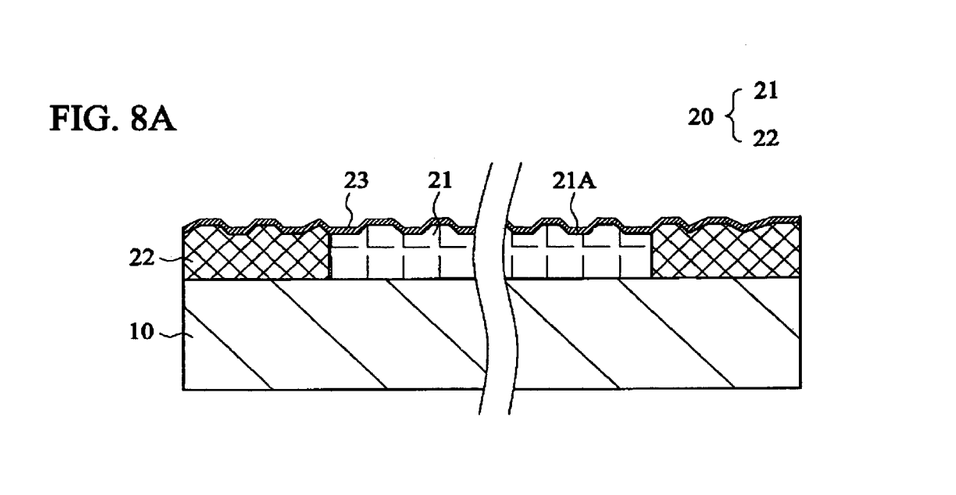
FIGS. 8A to 8C are schematic illustrations showing a method of manufacturing the sweep-type fingerprint sensing chip according to the preferred embodiment of the invention.
Figure 8B:
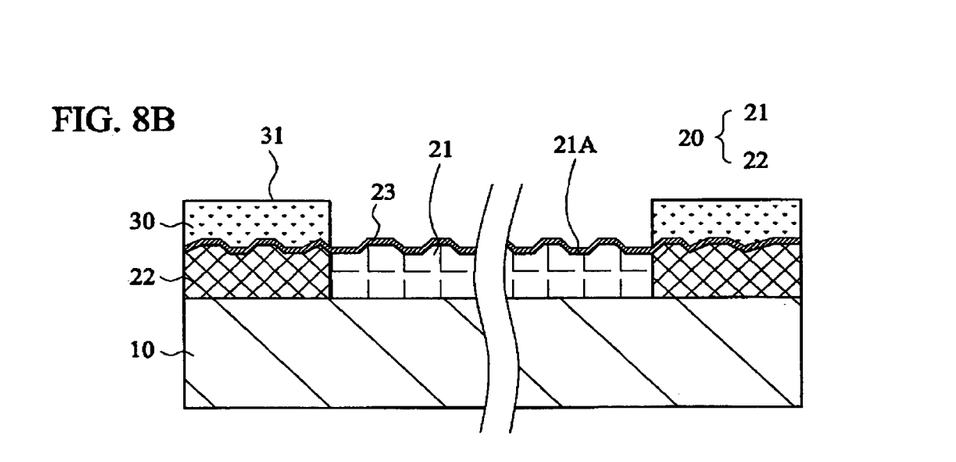
Figure 8C:
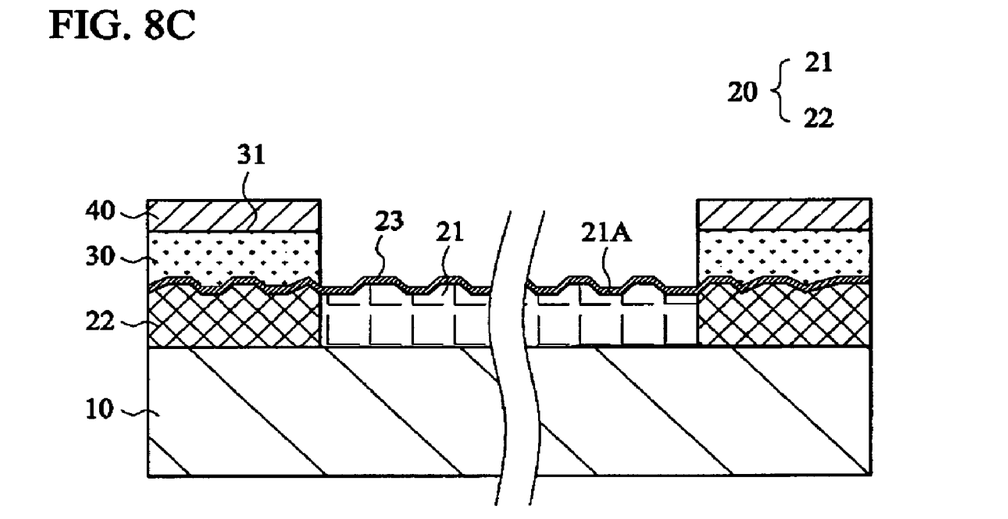

FIGS. 8A to 8C are schematic illustrations showing a method of manufacturing the sweep-type fingerprint sensing chip according to the preferred embodiment of the invention. The method of the invention includes the following steps.

First, as shown in FIG. 8A, the sweep-type fingerprint sensing chip 20 is formed on the semiconductor substrate 10. The sweep-type fingerprint sensing chip 20 mainly includes the sensing array region 21 and the peripheral circuit region 22. The sensing array region 21 having the fingerprint sensing area 21A senses the fingerprint fragment images of the finger as the finger sweeps thereacross. The peripheral circuit region 22, which is formed on the semiconductor substrate 10 and located aside the sensing array region 21, controls the operation of the sensing array region 21.

Next, as shown in FIG. 8B, the polymer layer 30, which has the flat and smooth outer surface 31, is formed on the peripheral circuit region 22. In this embodiment, the polymer layer 30 is formed by spin coating a polymeric material on the sweep-type fingerprint sensing chip 20 and then curing the polymeric material to make the polymer layer 30 have the flat and smooth outer surface 31. Then the polymer layer 30 is partially removed to expose the fingerprint sensing area 21A. The polymeric material may be polyimide, benzocyclobutene (BCB), SU-8 or any other suitable material. The thickness of the polymer layer 30 is greater than 2 microns, and preferably ranges from 2 microns to 5 microns. Alternatively, the polymer layer 30 may also be formed on the peripheral circuit region 22 by way of adhering or any other suitable method.

Then, as shown in FIG. 8C, the conducting metal layer 40 for discharging electrostatic charges is formed on the flat and smooth outer surface 31 of the polymer layer 30. The conducting metal layer 40 may be formed by many methods. In one method, for example, the metal layer 40 is firstly deposited on the flat and smooth outer surface 31 of the polymer layer 30 and the fingerprint sensing area 21A. Then, the metal layer 40 on the fingerprint sensing area 21A is partially removed to remain the residual metal layer 40 as the conducting metal layer for discharging electrostatic charges. The metal layer is made aluminum, gold or any other suitable material, and the thickness thereof is substantially greater than 1 micron.

In summary, the ESD protection design of the invention is to form the polymeric material (BCB, SU-8 or polyimide) on the fingerprint sensor by way of spin coating, and then to expose the fingerprint sensing area and the wire bonding area (not shown) by way of development of yellow process. In order to reduce the effect of the parasitic capacitor effectively, the thickness of the polymeric material of the invention after the polymer layer is formed is preferably greater than 2 microns. Then, the metal layer made of aluminum or gold is deposited, and the metal on the fingerprint sensing area is removed by yellow processes, and the invention is thus completed.

Thus, the invention adds the polymer layer between the metal layer and the dielectric layer of the sweep-type fingerprint sensing chip, and this structure can reduce the induced parasitic capacitor due to the enlarged gap between the metal layer and the analog circuit of the peripheral circuit region. Also, the selection of the polymeric material with the low-dielectric-constant may further reduce the influence of the parasitic capacitor. In addition, the polymeric material is made by way of spin coating, so a very smooth surface can be formed on the chip surface even if the chip surface is uneven. Thus, the problem of tip discharging between the surfaces of the metal layer and the polymer layer cannot occur easily, and the ability of resisting the ESD may be enhanced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A fingerprint chip structure, comprising:
    a semiconductor substrate;
    a fingerprint sensing chip, which is formed on the semiconductor substrate and comprises:
        a sensing array region having an exposed fingerprint sensing area for sensing a plurality of fingerprint fragment images of a finger as the finger sweeps across the sensing array region; and
        a peripheral circuit region, which is formed on the semiconductor substrate and located aside the sensing array region, for controlling an operation of the sensing array region;
    a polymer layer, which is disposed on the peripheral circuit region and has a flat and smooth outer surface; and
    a conducting metal layer, which is disposed on the flat and smooth outer surface of the polymer layer, for discharging electrostatic charges, wherein a thickness of the conducting metal layer is substantially greater than 1 micron.

2. The structure according to claim 1, wherein the polymer layer is made of polyimide, benzocyclobutene (BCB) or SU-8.

3. The structure according to claim 1, wherein a thickness of the polymer layer is substantially greater than 2 microns.

4. The structure according to claim 1, wherein a thickness of the polymer layer substantially ranges from 2 microns to 5 microns.

5. The structure according to claim 1, wherein the conducting metal layer is made of aluminum or gold.

6. A method of manufacturing a fingerprint chip structure, the method comprising the steps of:
    (a) forming a fingerprint sensing chip on a semiconductor substrate, wherein the fingerprint sensing chip comprises: a sensing array region having an exposed fingerprint sensing area for sensing a plurality of fingerprint fragment of a finger as the finger sweeps across the sensing array region and a peripheral circuit region, which is formed on the semiconductor substrate and located aside the sensing array region, for controlling an operation of the sensing array region;

(b) forming a polymer layer on the peripheral circuit region, the polymer layer having a flat and smooth outer surface; and (c) forming a conducting metal layer for discharging electrostatic charges on the flat and smooth outer surface of the polymer layer, wherein a thickness of the conducting metal layer is substantially greater than 1 micron.

7. The method according to claim 6, wherein the step (b) comprises the sub-steps of:
  (b1) spin coating a polymeric material on the fingerprint sensing chip;
  (b2) curing the polymeric material to form the polymer layer having the flat and smooth outer surface; and
  (b3) partially removing the polymer layer to expose the fingerprint sensing area.

8. The method according to claim 6, wherein the polymer layer is made of polyimide, benzocyclobutene (BCB) or SU-8.

9. The method according to claim 6, wherein a thickness of the polymer layer is substantially greater than 2 microns.

10. The method according to claim 6, wherein a thickness of the polymer layer substantially ranges from 2 microns to 5 microns.

11. The method according to claim 6, wherein the conducting metal layer is made of aluminum or gold.

12. The method according to claim 6, wherein the step (c) comprises the sub-steps of:
  (c1) depositing a metal layer on the flat and smooth outer surface of the polymer layer and the fingerprint sensing area; and
  (c2) partially removing the metal layer located on the fingerprint sensing area to remain the residual metal layer as the conducting metal layer for discharging the electrostatic charges.

* * * * *